(12) United States Patent
Yamamura et al.

(10) Patent No.: US 9,817,398 B2
(45) Date of Patent: Nov. 14, 2017

(54) CONTROL APPARATUS FOR AUTONOMOUSLY NAVIGATING UTILITY VEHICLE

(71) Applicant: Honda Motor Co., Ltd., Tokyo (JP)

(72) Inventors: Makoto Yamamura, Wako (JP);
Toshiaki Kawakami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/080,205

(22) Filed: Mar. 24, 2016

(65) Prior Publication Data

US 2016/0282869 A1 Sep. 29, 2016

(30) Foreign Application Priority Data

Mar. 27, 2015 (JP) ................................. 2015-067218

(51) Int. Cl.
*G05D 1/00* (2006.01)
*G05B 15/00* (2006.01)
*G05D 1/02* (2006.01)

(52) U.S. Cl.
CPC ......... *G05D 1/0088* (2013.01); *G05D 1/0212* (2013.01); *G05D 1/0225* (2013.01); *G05D 1/0265* (2013.01); *G05D 1/0274* (2013.01); *G05D 2201/0208* (2013.01)

(58) Field of Classification Search
USPC ............................................ 701/25; 700/259
See application file for complete search history.

(56) References Cited

U.S. PATENT DOCUMENTS

| | | | |
|---|---|---|---|
| 8,275,506 B1* | 9/2012 | Bishel | A01D 34/008 701/25 |
| 2003/0144774 A1* | 7/2003 | Trissel | A01D 34/008 701/23 |
| 2005/0192749 A1 | 9/2005 | Flann et al. | |
| 2008/0097645 A1* | 4/2008 | Abramson | A01D 34/008 700/258 |
| 2010/0299016 A1* | 11/2010 | Benzler | G05D 1/0246 701/26 |

(Continued)

FOREIGN PATENT DOCUMENTS

JP 2013164742 A 8/2013

*Primary Examiner* — Tyler Paige
(74) *Attorney, Agent, or Firm* — Duft Bornsen & Fettig LLP

(57) ABSTRACT

In an apparatus for controlling operation of an autonomously navigating utility vehicle equipped with a prime mover to travel about a working area delineated by a boundary wire in order to perform work autonomously, there are provided with an objective location identifying unit that identifies a location of an objective in the working area, a route generating unit that generates a target return route for the vehicle to return to the objective, and a travel controlling unit that controls operation of the prime mover to make the vehicle travel along the target return route. The route generating unit selects, among a first set of radial lines imaginarily drawn on the working area to radiate from the position of the vehicle and a second set of radial lines imaginarily drawn on the working area to radiate from the objective, a first radial line and a second radial line that result in shortest distance from the position of the vehicle to the objective and generates the target return route by the first radial line and the second radial line.

10 Claims, 7 Drawing Sheets

(56) References Cited

U.S. PATENT DOCUMENTS

| | | | |
|---|---|---|---|
| 2011/0040409 A1* | 2/2011 | Biber | A01B 69/008 |
| | | | 700/259 |
| 2011/0153172 A1* | 6/2011 | Anderson | A01B 69/008 |
| | | | 701/50 |
| 2011/0202307 A1* | 8/2011 | Petereit | A01D 34/008 |
| | | | 702/150 |
| 2012/0083962 A1* | 4/2012 | Sato | G05D 1/0261 |
| | | | 701/25 |
| 2012/0083963 A1* | 4/2012 | Sato | G05D 1/0259 |
| | | | 701/25 |
| 2012/0290165 A1* | 11/2012 | Ouyang | G05D 1/0255 |
| | | | 701/25 |
| 2013/0041526 A1* | 2/2013 | Ouyang | G05D 1/0265 |
| | | | 701/2 |
| 2013/0205736 A1* | 8/2013 | Maruyama | A01D 34/82 |
| | | | 56/12.9 |
| 2014/0018996 A1 | 1/2014 | Mian et al. | |
| 2014/0058611 A1* | 2/2014 | Borinato | G05D 1/0265 |
| | | | 701/23 |
| 2015/0114082 A1* | 4/2015 | Blanchard | G01C 25/005 |
| | | | 73/1.77 |
| 2015/0296707 A1* | 10/2015 | Fukuda | A01D 34/008 |
| | | | 701/25 |

* cited by examiner

CONTROL APPARATUS FOR AUTONOMOUSLY NAVIGATING UTILITY VEHICLE

CROSS-REFERENCE TO RELATED APPLICATION

This application is based upon and claims the benefit of priority from Japanese Patent Application No. 2015-067218 filed on Mar. 27, 2015, the contents of which are incorporated herein by reference.

BACKGROUND OF THE INVENTION

Field of the Invention

This invention relates to a control apparatus for an autonomously navigating utility vehicle that autonomously navigates and performs lawn mowing and/or other tasks in a working area delineated by a boundary wire.

Description of Related Art

Control apparatuses are known that control an autonomously navigating utility vehicle equipped with electric motors and a battery so as to perform a task while autonomously traveling in a working area delineated by a boundary wire as taught by Japanese Laid-Open Patent Application No. 2013-164742, for example. When the battery requires charging, the control apparatus described in this reference returns the utility vehicle to a charging station by driving it along the boundary wire on the basis of detection values from magnetic sensors.

However, the driving of the utility vehicle along the boundary wire by the control apparatus described in the reference causes a path to a target position (charging station) to become long. As a result, efficient movement to the utility vehicle target position cannot be realized.

SUMMARY OF THE INVENTION

According to an aspect of the present invention, there is provided an apparatus for controlling operation of an autonomously navigating utility vehicle equipped with a prime mover to travel about a working area delineated by a boundary wire in order to perform work autonomously, comprising: a position detector that detects a position of the vehicle in the working area; an objective location identifying unit that identifies a location of an objective in the working area; a route generating unit that generates a target return route for the vehicle to return from the position detected by the position detector to the objective whose location is identified by the objective location identifying unit, the route generating unit selecting, among a first set of radial lines imaginarily drawn on the working area to radiate from the position of the vehicle and a second set of radial lines imaginarily drawn on the working area to radiate from the location of the objective, a first radial line and a second radial line that result in shortest distance from the position of the vehicle to the location of the objective and generating the target return route by the first radial line and the second radial line; and a travel controlling unit that controls operation of the prime mover to make the vehicle travel along the target return route generated by the route generating unit.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
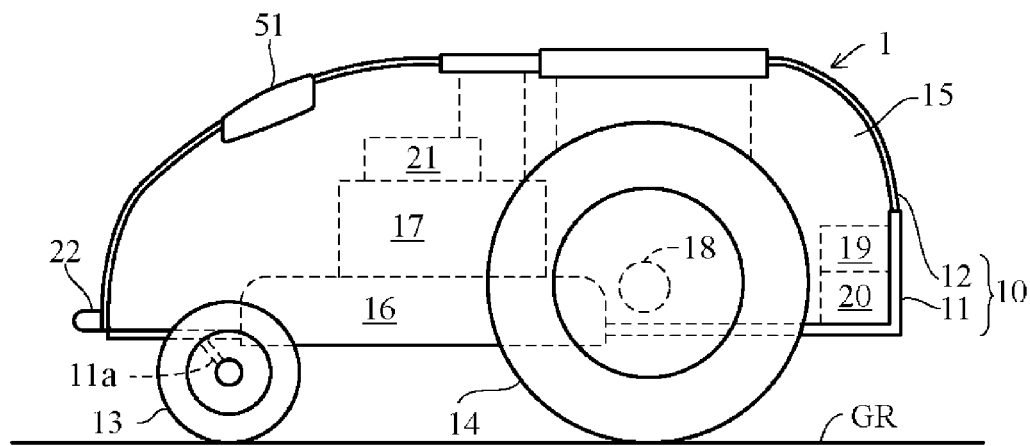
FIG. 1 is a side view schematically illustrating configuration of an autonomously navigating utility vehicle according to an embodiment of this invention.

An embodiment of the present invention is explained with reference to FIGS. 1 to 11 in the following. FIG. 1 is a side view schematically illustrating the configuration of an autonomously navigating utility vehicle according to an embodiment of the present invention, and FIG. 2 is plan view of the same.

The autonomously navigating utility vehicle of the present invention can be embodied in the form of various types of utility vehicle and particularly as a lawn mower for lawn or grass mowing work. In the following, the forward direction (longitudinal direction) of the utility vehicle in plan view and the vehicle width direction perpendicular to the forward direction are defined as the forward-rearward direction and the leftward-rightward direction, respectively, and the height direction of the utility vehicle is defined as the upward-downward direction. The configuration of the constituents is explained in line with these definitions.

Figure 2:
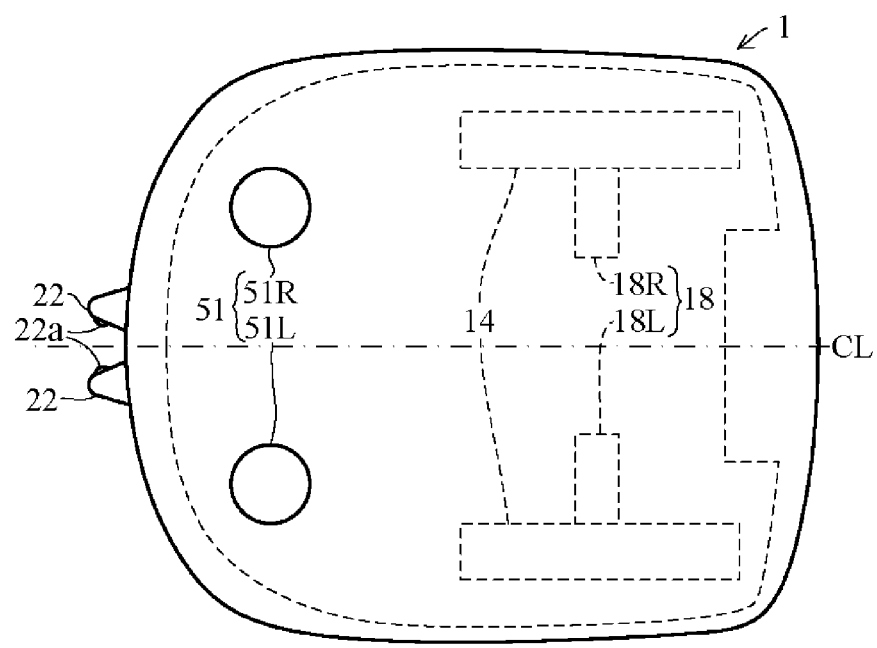
FIG. 2 is a plan view schematically illustrating the configuration of the utility vehicle according to the embodiment.

As shown in FIGS. 1 and 2, an autonomously navigating utility vehicle (hereinafter called simply "vehicle") 1 is equipped with a body 10 having a chassis 11 and a frame 12, along with a pair of left and right front wheels 13 and a pair of left and right rear wheels 14 that support the body 10 above a ground surface GR so as to be capable of travel.

The front wheels 13 are rotatably fastened through stays 11a to the front end of the chassis 11. The rear wheels 14, which are greater in diameter than the front wheels 13, are rotatably fastened directly to the rear end of the chassis 11. The weight and size of the vehicle 1 are such that it can be transported by an operator. As an example can be cited a vehicle 1 whose total length (forward-rearward direction length) is about 500 mm, total width about 300 mm, and height about 300 mm.

A work unit 16, a work motor 17 for driving the work unit 16, travel motors (prime mover) 18 for driving the rear wheels 14, a battery charging unit 19 and a battery 20 are deployed in an internal space 15 of the vehicle 1 enclosed by the chassis 11 and the frame 12.

The work unit 16 comprises a rotor and blades attached to the rotor and has a substantially disk-like shape as a whole. A rotating shaft is installed vertically at the center of the rotor and the work unit 16 is configured to enable adjustment of the height of the blades above the ground GR through a height regulating mechanism 21 by the operator. The height regulating mechanism 21 is equipped with, for example, a screw operable by the operator. The work motor 17 is constituted by an electric motor installed above the work unit 16, and an output shaft thereof is connected to the rotating shaft of the rotor to rotate the blades unitarily with the rotor.

The travel motors 18 comprise a pair of electric motors 18L and 18R installed on the right and left inner sides of the left and right rear wheels 14. Output shafts of the travel motors 18L and 18R are connected to rotating shafts of the left and right rear wheels 14, respectively, so as each to independently drive or rotate the left or right rear wheel 14. In other words, the vehicle 1 comprises the front wheels 13 as non-driven free wheels and the rear wheels 14 as driving wheels, and the travel motors 18L and 18R each independently rotates one of the rear wheels 14 normally (rotation to move forward) or reversely (rotation to move reverse). By establishing a difference between the rotating speeds of the left and right rear wheels 14, the vehicle 1 can be turned to an arbitrary direction.

For example, when the left and right rear wheels 14 are both rotated normally and the rotational speed of the right rear wheel 14 is greater than the rotational speed of the left rear wheel 14, the vehicle 1 turns left at a turning angle θ in accordance with the speed difference. Conversely, when the rotational speed of the left rear wheel 14 is greater than the rotational speed of the right rear wheel 14, the vehicle 1 turns right at a turning angle θ in accordance with the speed difference. When one of the left and right rear wheels 14 is rotated normally and the other reversely both at the same speed, the vehicle 1 turns on the spot.

The charging unit 19, which includes an AC-DC converter, is connected by wires to charging terminals 22 provided at the front end of the frame 12 and is also connected by wires to the battery 20. The charging terminals 22 have contacts 22a, and the battery 20 can be charged by connecting the charging terminals 22 through the contacts 22a to a charging station 3 (see FIG. 5). The battery 20 is connected through wires to the work motor 17 and the travel motors 18, and the work motor 17 and the travel motors 18 are driven by power supplied from the battery 20 through drivers.

Figure 3:
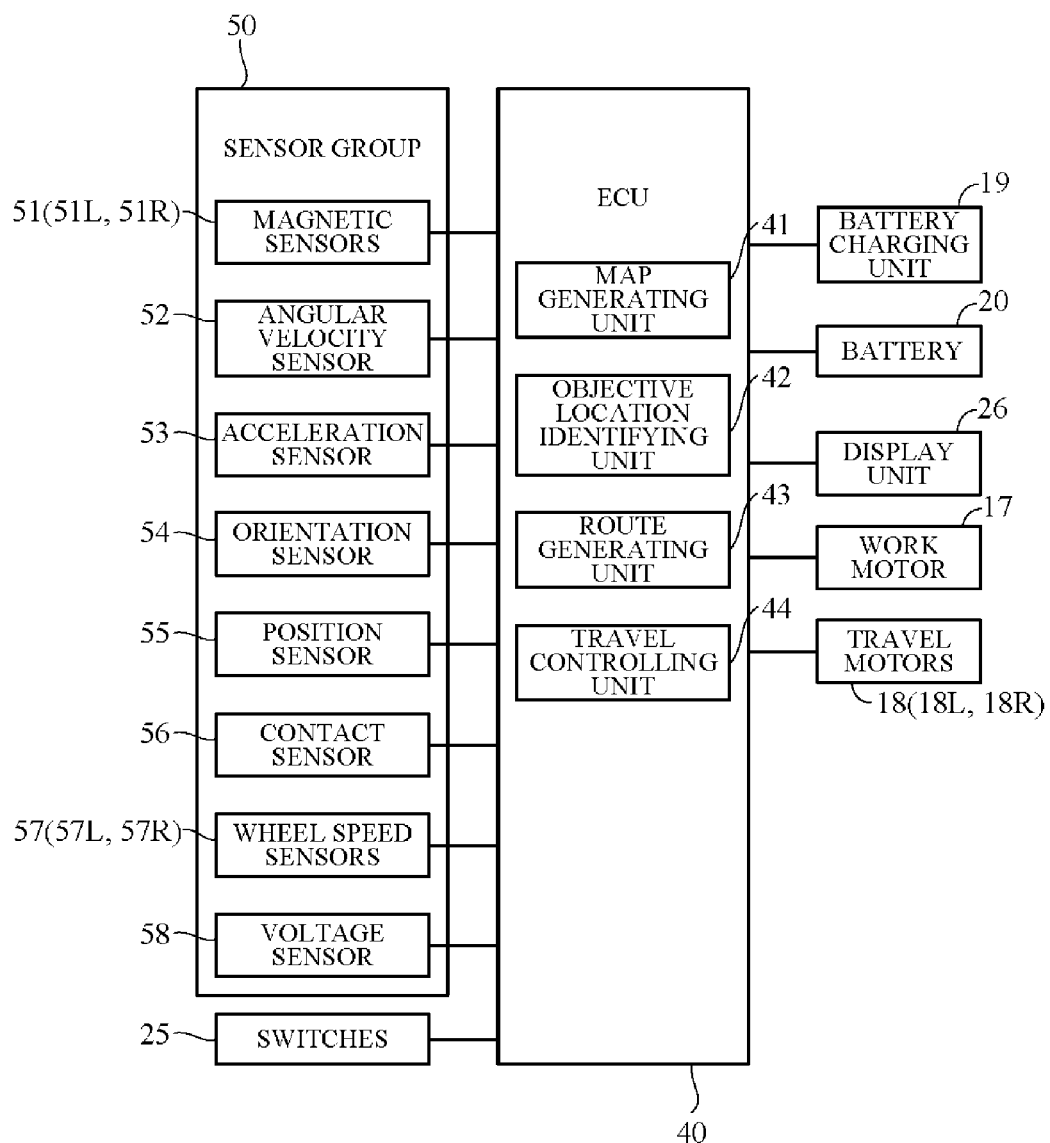
FIG. 3 is a block diagram showing the configuration of the control apparatus of the vehicle according to the present embodiment including an ECU.

FIG. 3 is a block diagram showing the configuration of the control apparatus of the vehicle 1 according to the present embodiment. As shown in FIG. 3, an Electronic Control Unit (ECU) 40 is mounted on the vehicle 1. The ECU 40 has a microcomputer of a configuration including an arithmetic processing unit (CPU) and memories ROM, RAM and other peripheral circuits.

The ECU 40 is connected with a group of sensors collectively designated by reference numeral 50 that detects various conditions of the vehicle 1, charging unit 19, battery 20, a group of switches 25, display unit 26, work motor 17 and travel motors 18 (18R, 18L). The group of sensors 50 includes a pair of magnetic sensors 51 (51R, 51L), an angular velocity sensor (turning angle sensor) 52, an acceleration sensor 53, an orientation sensor 54, a position sensor 55, a contact sensor 56, a pair of wheel speed sensors 57 (57R, 57L), and a voltage sensor 58.

The magnetic sensors 51, i.e., 51R and 51L are installed laterally spaced apart on the front end of the vehicle 1. More specifically, as shown in FIG. 2, the magnetic sensors 51R and 51L are installed laterally symmetrically with respect to a center line CL running in the straight forward direction along the widthwise center of the vehicle 1. The magnetic sensors 51 produces an output indicating magnitude of magnetic field (magnetic field strength (intensity) H).

The angular velocity sensor 52 produces an output indicating angular velocity (yaw rate) occurring around a height direction (z-axis) of the vehicle 1, from which a turning angle θ of the vehicle 1 around the z-axis can be calculated. The acceleration sensor 53 produces an output indicating acceleration acting on the vehicle 1 in the directions of three orthogonal axes (x-axis, y-axis, and z-axis).

The orientation sensor 54 comprises a geomagnetic sensor of 2-axis or 3-axis structure that produces an output indicating geomagnetism, from which an orientation of the vehicle 1 relative to a reference orientation (e.g., north) can be detected.

The position sensor 55 produces an output indicating the position (self-position) of the vehicle 1 in longitude and latitude by receiving radio waves transmitted from GPS satellites. The contact sensor 56 produces an output of ON signal when the frame 12 is detached from the chassis 11 owing to contact with an obstacle or the like. Each of the pair of wheel speed sensors 57R, 57L produces an output indicating wheel speed of one of the left and right rear wheels 14, from which a travel distance of the vehicle 1 can be calculated. The voltage sensor 58 produces an output indicating a residual voltage of the battery 20.

The switches 25 have various switches provided to be manipulatable by the operator and includes a main switch for inputting various commands, inter alia, start of vehicle 1 operation, and an emergency stop switch for stopping the vehicle 1 in an emergency.

The display unit 26 has a display that shows various information to be supplied to the operator. The switches 25 and display unit 26 may be constituted by a touch panel.

Figure 4:
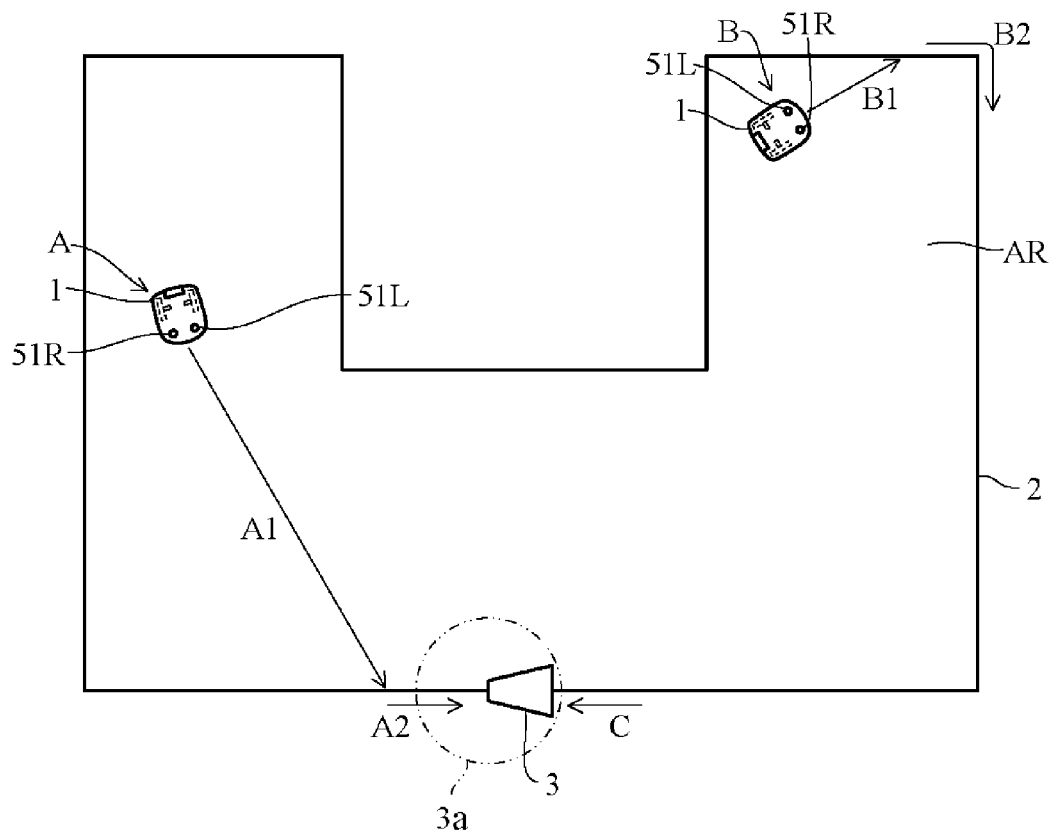
FIG. 4 is a diagram showing an example of a working area.

The vehicle 1 configured as described above performs a task while autonomously navigating within a predefined working area. FIG. 4 is a diagram showing an example of a working area AR. The working area AR is, for example, delineated by a boundary wire 2 that constitutes a boundary line (L0) and is laid beforehand (e.g., buried a predetermined depth under the ground surface GR). A magnetic field is generated in the working area AR by passing electric current through the boundary wire 2. The charging station 3 for charging the battery 20 is situated above the boundary wire 2. The working area AR defines the travel range of the vehicle 1 and may include not only area(s) to be serviced but also area(s) not to be serviced.

Figure 5:
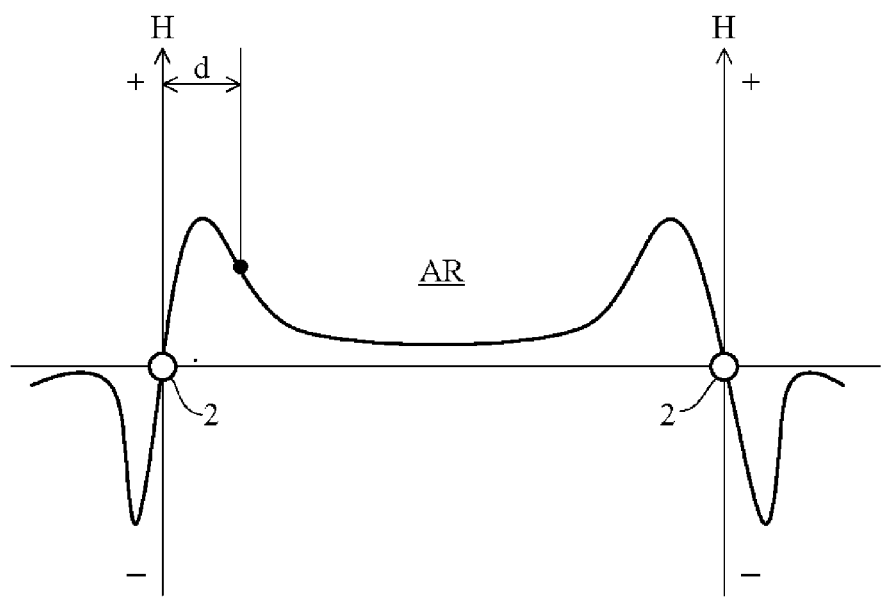
FIG. 5 is a diagram showing relation between distance from the boundary wire and magnetic field strength.

FIG. 5 is a diagram showing relation between distanced from the boundary wire 2 and magnetic field strength H. As indicated in FIG. 5, magnetic field strength H varies with distance d from the boundary wire 2. Specifically, magnetic field strength H is 0 above the boundary wire 2, positive inside the working area AR, and negative outside the same. When work is in progress, the ECU 40 reads outputs of the magnetic sensors 51L and 51R, and when the output is minus, turns the vehicle 1 toward inside the working area AR at a random angle based on, for example, the output of the angular velocity sensor 52. As a result, work can be carried out inside the working area AR while the vehicle 1 is being driven (forward at random, for example).

Figure 6:
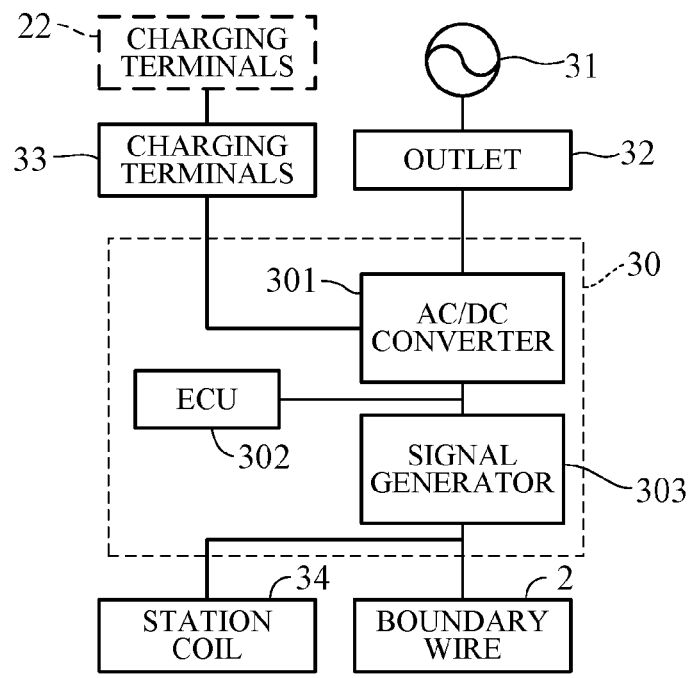
FIG. 6 is a block diagram showing a configuration of the charging station installed on the boundary wire of FIG. 4.

FIG. 6 is a block diagram showing a configuration of the charging station 3 installed on the boundary wire 2. As shown in FIG. 6, the charging station 3 has a charger 30 connected through an outlet 32 to a commercial power supply 31, and terminals 33 and a station coil 34 connected to the charger 30. The charger 30 has an AC/DC converter 301, an ECU (electronic control unit) 302 that controls operation of the AC/DC converter 301, and a signal generator 303 that applies alternating current to the boundary wire 2 and station coil 34 to generate signals.

Alternating current from the commercial power supply 31 is stepped down to a suitable voltage by the AC/DC converter 301. When the vehicle 1 returns to the charging station 3 and the contacts 22a of the terminals 22 of the vehicle 1 connect with the terminals 33, power stepped-down by the AC/DC converter 301 is supplied to the vehicle 1 to charge the battery 20. The station coil 34 is installed on the charging station 3 and a magnetic field is generated by current passing through the station coil 34. As shown in FIG. 4, this magnetic field forms a charger detection zone 3a within a circle of about 1 m radius centered on the charging station 3. Entry of the vehicle 1 into the charger detection zone 3a is detected by the magnetic sensors 51.

In the present embodiment, the vehicle 1 operates in work mode, trace mode and return mode in response to control commands sent from the ECU 40 in accordance with programs prepared beforehand and memorized in the memory (ROM). In work mode, the vehicle 1 works (mows lawn or grass) while autonomously navigating in the working area AR. In return mode, the vehicle 1 is returned to the charging station 3 when the battery 20 requires charging. In trace mode, the vehicle 1 is driven along the boundary wire 2. Trace mode is executed before work mode to ascertain the working area AR.

Figure 7:
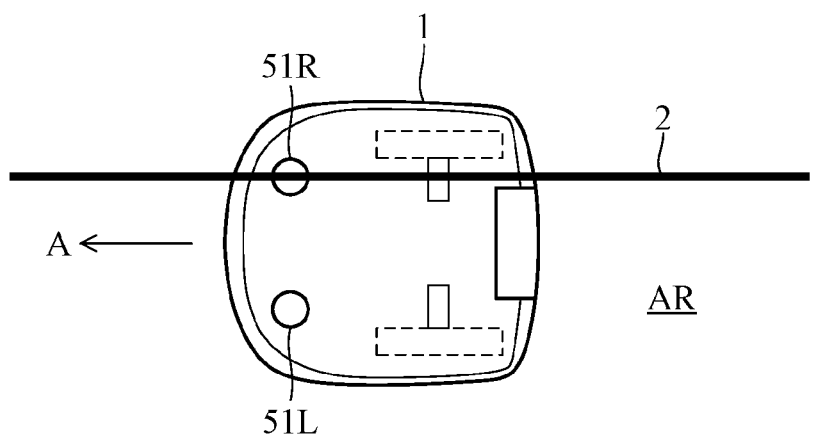
FIG. 7 is a diagram showing operation of the utility vehicle in trace mode.

FIG. 7 is a diagram showing operation of the vehicle 1 in trace mode. As shown in FIG. 7, in trace mode the vehicle 1 is driven by commands from the ECU 40 to circuit along the boundary wire 2 with one of the pair of magnetic sensors 51R and 51L (e.g., 51L) positioned inside the boundary wire 2 and so that the other magnetic sensor (e.g., 51R) moves above the boundary wire 2 in the direction of arrow A. Specifically, the ECU 40 monitors output of the magnetic sensor 51R and controls operation of the travel motors 18L and 18R so that magnetic field strength H detected by the magnetic sensor 51R stays at 0.

For example, when magnetic field strength H detected from the output of the magnetic sensor 51R becomes positive, the vehicle 1 is turned rightward by decelerating right travel motor 18R and accelerating left travel motor 18L. On the other hand, when magnetic field strength H detected from the output of the magnetic sensor 51R becomes negative, the vehicle 1 is turned leftward by accelerating the right travel motor 18R and decelerating the left travel motor 18L. As a result, the right magnetic sensor 51R is brought near the boundary wire 2 and magnetic field strength H detected by the right magnetic sensor 51R is maintained at 0.

Trace mode is started from a state in which the terminals 22 of the vehicle 1 are connected to the terminals 33 of the charging station 3 and ends when the terminals 22 again connect to the terminals 33 after the vehicle 1 makes a circuit along the boundary wire 2. Position of the vehicle 1 from start to finish of trace mode travel is detected by the position sensor 55. Based on signals from the position sensor 55, the ECU 40 identifies working area AR boundary line (L0 in FIG. 8) position coordinates with respect to the charging station 3 as a reference (origin).

As regards return mode, if the vehicle 1 is trace-driven along the boundary wire 2, it can be returned to the charging station 3 constituting the target position. For example, the vehicle 1 at position A in FIG. 4 is driven straight forward as indicated by arrow A1, turned toward the charging station 3 upon arriving at the boundary wire 2, and driven along the boundary wire 2 as indicated by arrow A2. Or the vehicle 1 at position B in FIG. 4 is driven straight forward as indicated by arrow B1, turned toward the charging station 3 upon arriving at the boundary wire 2, and driven along the boundary wire 2 as indicate by arrow B2. As a result, the vehicle 1 can be returned to the charging station 3 on the boundary wire 2.

However, when the vehicle 1 is returned by trace-driving, distance traveled during return becomes long. As a result, time required for return increases and working efficiency declines. Moreover, the vehicle 1 passes along the same route (above the boundary wire 2) during every return, so that ruts tend to form along the boundary wire 2. Therefore, the control apparatus according to the present embodiment is configured as follows in order to prevent occurrence of ruts and realize efficient return mode.

As shown in FIG. 3, as functional constituents related mainly to return mode, the ECU 40 has a map generating unit 41, an objective location identifying unit 42, a route generating unit 43, and a travel controlling unit 44.

In trace mode, the map generating unit 41 generates a map of the working area AR (working area map MP) based on output of the position sensor 55 when the vehicle 1 is driven in trace mode. Travel by trace mode is required only once after laying the boundary wire 2, and the working area map MP obtained at this time is stored in the RAM (memory) of the ECU 40.

Figure 8:
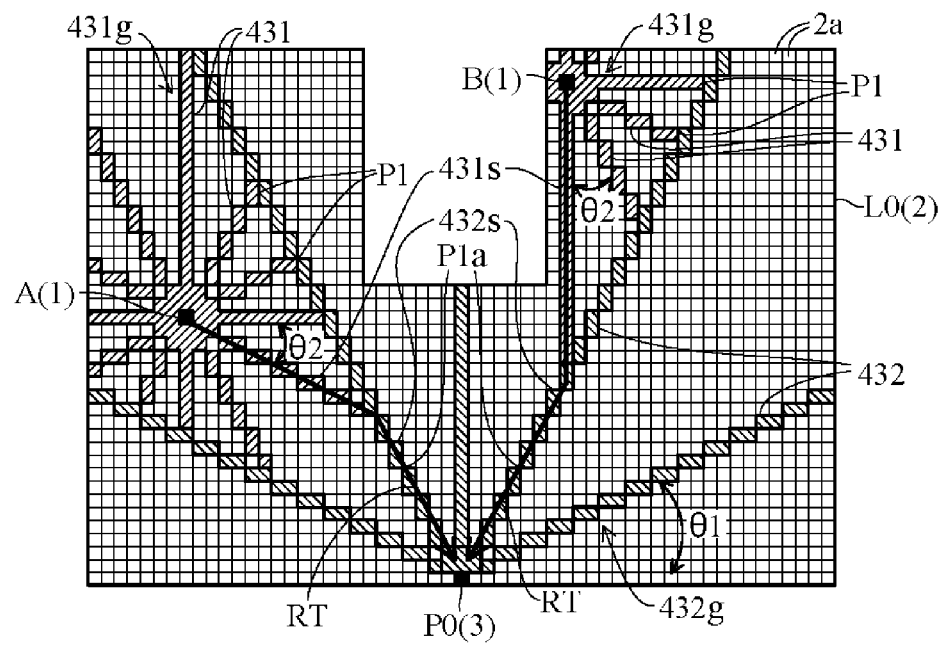
FIG. 8 is a diagram showing an example of a working area map.

FIG. 8 is a diagram showing an example of the working area map MP. The working area map MP is generated based on position of the vehicle 1 detected from the output of the position sensor 55 and position P0 of the charging station 3. Position of the boundary wire 2 on the working area map MP is represented by the boundary line L0.

Specifically, position P0 of the charging station 3 at the start of trace mode travel is taken as an origin and the working area AR inside the boundary line L0 is divided grid-like at equal intervals on an orthogonal two-axis coordinate plane (XY plane) based on a predetermined direction defined by the orientation sensor 54. By this, multiple cells 2a are arrayed in the working area AR to form the working area map MP. Each of the cells 2a of the so-formed working area map MP has its own unique position coordinates (X coordinate and Y coordinate). Otherwise, rather than dividing the working area AR inside the boundary line L0 at equal intervals, it is possible instead to define a predetermined position (e.g., position of the charging station 3) as an origin and form the cells 2a at predetermined pitch in the X direction and the Y direction.

The objective location identifying unit 42 identifies location (position) of an objective, more specifically the charging station 3, as seen from current position of the vehicle 1 (e.g., position A or position B in FIG. 8), on the working area map MP. As the charging station 3 is located at position P0 of the working area map MP, location of the charging station 3 as seen from the vehicle 1 can be identified by detecting position of the vehicle 1 with the position sensor 55 to ascertain position coordinates (XY coordinates) of the vehicle 1 on the working area map MP.

The route generating unit 43 generates a target return route RT from current position of the vehicle 1 detected from the output of the position sensor 55 to the charging station 3 whose location is identified by the objective location identifying unit 42. In this case, first, as shown in FIG. 8, a first set of radial lines 431g (hatched portions) and a second set of radial lines 432g (hatched portions) are drawn on the working area map MP. The first set of radial lines 431g comprises multiple first radial lines 431 radiating into the working area AR from the position of the vehicle 1 at angular increments of θ1 (30 degrees in the drawing), and the second set of radial lines 432g comprises multiple second radial lines 432 radiating into the working area AR from the charging station 3 at angular increments of θ2 (30 degrees in the drawing). The multiple first radial lines 431 and second radial lines 432 are drawn of cell unit segments. The first set of radial lines 431g and second set of radial lines 432g are drawn on the basis of predetermined orientation detected from the output of the orientation sensor 54. Here, the above corresponds to a first set of radial lines 431g imaginarily drawn on the working area AR to radiate from the position of the vehicle 1 and a second set of radial lines 432g imaginarily drawn on the working area AR to radiate from the charging station (objective).

Next, the route generating unit 43 selects, from among the first set of radial lines 431g and second set of radial lines 432g, a first radial line 431s and a second radial line 432s that result in shortest distance from the vehicle 1 to the charging station 3. It then uses the selected first radial line 431s and second radial line 432s to generate the target return route RT.

In the case where, as shown in FIG. 8, since the first set of radial lines 431g and the second set of radial lines 432g intersect at multiple intersecting points P1, there are generated multiple return routes along the first set of radial lines 431g and second set of radial lines 432g via respective intersection points P1. Therefore, the route generating unit 43 calculates or obtains intersection points P1 of the first set of radial lines 431g and second set of radial lines 432g and selects, from among the multiple routes, a route including the first radial line 431s and second radial line 432s of shortest distance (number of cells 2a) from current position of the vehicle 1 to the charging station 3 that intersect an intersection point (target intersection point) P1a.

Figure 9:
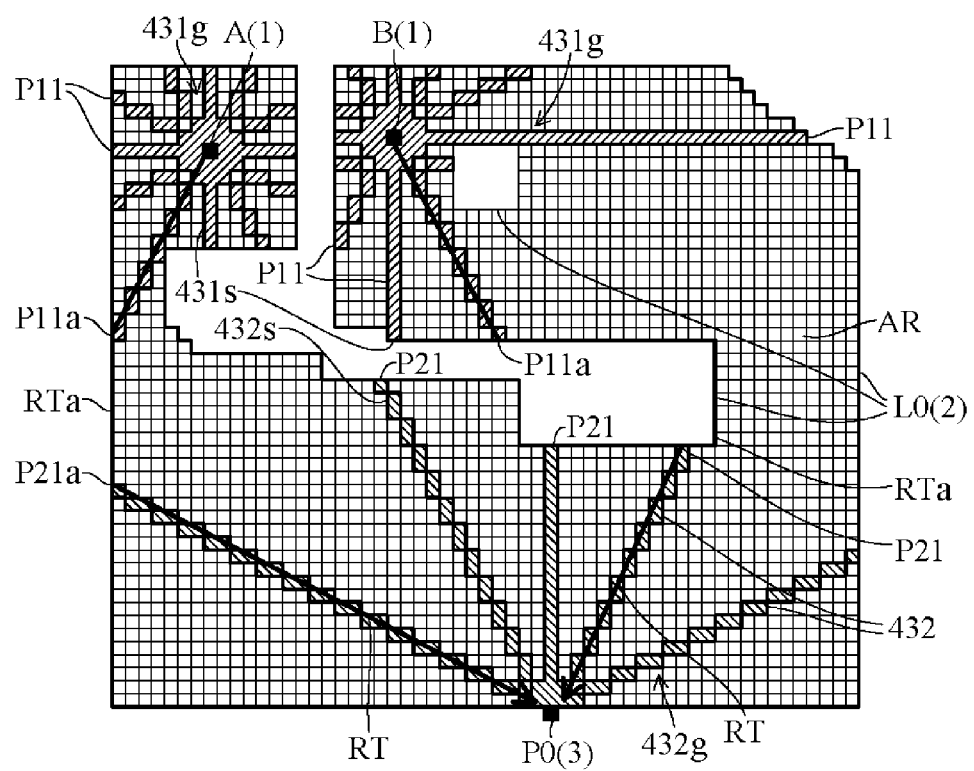
FIG. 9 is a diagram showing another example of a working area map.

On the other hand, when no intersection point P1 between the first set of radial lines 431g and second set of radial lines 432g is present in the working area AR, the route generating unit 43 generates the target return route RT as set out below. FIG. 9 is a diagram showing another example of the working area map MP. In FIG. 9, the first set of radial lines 431g radiating from current position A or B of the vehicle 1 do not intersect any second set of radial lines 432g radiating from the charging station 3. Thus, no intersection point P1 between the first radial lines 431 and second radial lines 432 exists and they only intersect positions of the boundary wire 2 indicated by the boundary line L0.

In such case, the route generating unit 43 first calculates multiple first intersection points P11 where the first set of radial lines 431g intersect the boundary line L0 and multiple second intersection points P21 where the second set of radial lines 432g intersect the boundary line L0. Next, it generates the target return route RT to include a boundary route segment RTa along the boundary wire 2 from one of intersection points P11 to one of intersection points P21.

Specifically, the route generating unit 43 selects, from among the first set of radial lines 431g and second set of radial lines 432g, ones that result in the shortest route from current position of the vehicle 1 (position A or B in FIG. 9) via the boundary route segment RTa to the position P0 of the charging station 3, as the first radial line 431s and second radial line 432s. It then generates the target return route RT based on the selected first radial line 431s and second radial line 432s, plus the boundary route segment RTa.

More specifically, as shown in FIG. 9, the boundary route segment RTa of the target return route RT is generated between a first intersection point (first target intersection point) P11a selected from among the multiple first intersection points P11 and a second intersection point (second target intersection point) P21a selected from among the multiple second intersection points P21, in a such manner that no other intersection point P11 or P21 is present between the first target intersection point P11a and second target intersection point P21a.

In other words, the route generating unit 43 generates the target return route RT by selecting the first target intersection point P11a (from among the first intersection points P11) and the second target intersection point P21a (from among the second intersection points P21) such that the points P11a, P21a result in shortest path from current position of the vehicle via the boundary route segment RTa to the position Po of the charging station 3. The route generating unit 43 memorizes the generated target return route RT in the memory (RAM) of the ECU 40 before the vehicle 1 performs a return operation.

The travel controlling unit 44 detects orientation and position of the vehicle 1 on the basis of the outputs of the orientation sensor 54 and the position sensor 55 and outputs control commands to the travel motors 18 to control operation of the travel motors 18 so that the vehicle 1 travels along the target return route RT generated by the route generating unit 43. As a result, efficient return operation can be achieved because the return distance traveled to the charging station 3 is shorter than when the vehicle 1 is trace-driven along the boundary wire 2.

Figure 10:
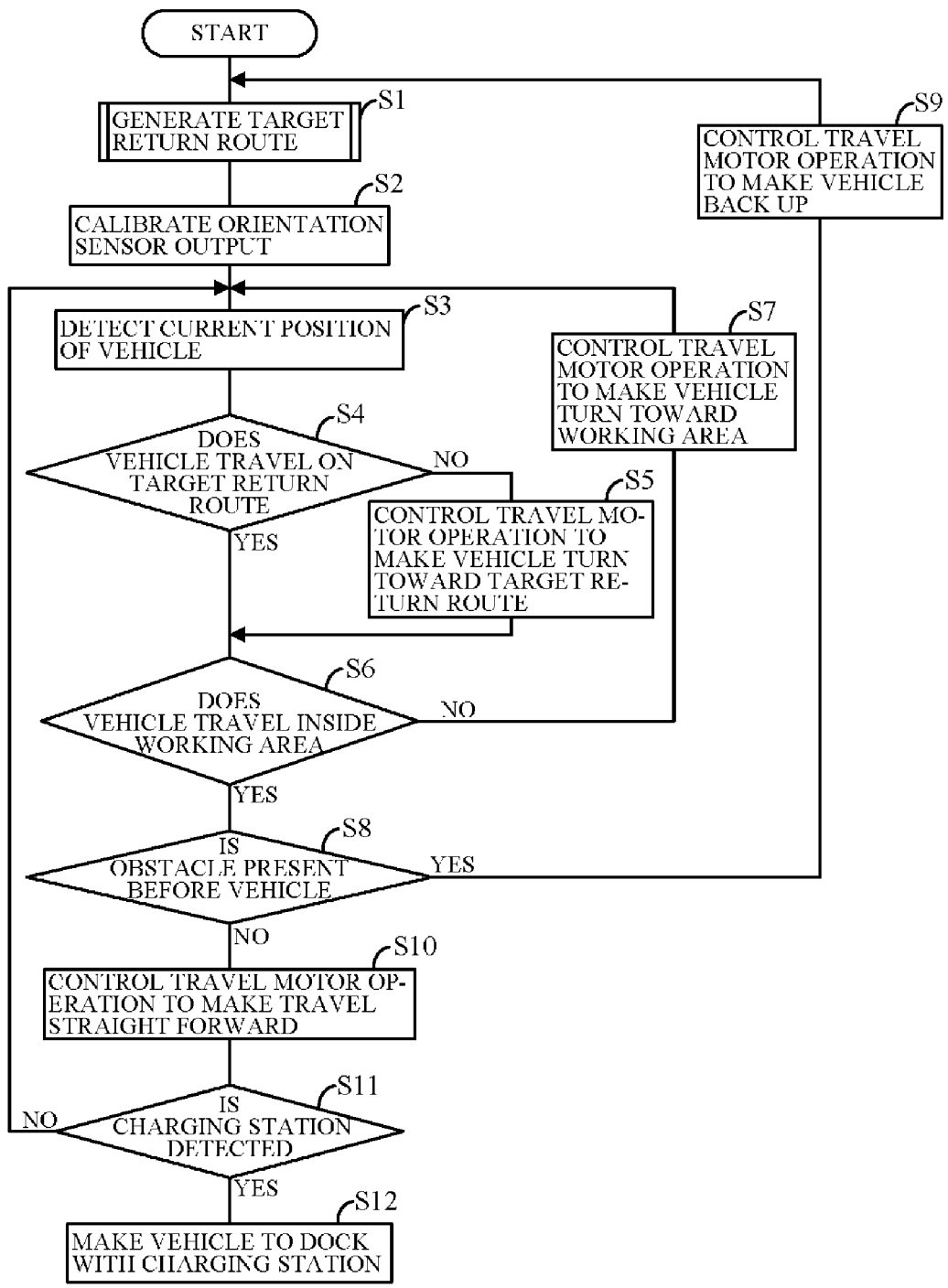
FIG. 10 is a flowchart showing processing performed in an ECU of FIG. 3.

FIG. 10 is a flowchart showing processing performed in the ECU 40, primarily an example of processing during return mode. The processing shown in this flowchart is started after driving the vehicle 1 in trace mode to acquire the working area map MP in advance, when, in the course of performing a task in work mode, output of the voltage sensor 58 falls to or below a predetermined value, indicating that the battery 20 requires charging.

First, in S1, the target return route RT from the vehicle 1 to the charging station 3 is generated (S: processing Step).

Figure 11:
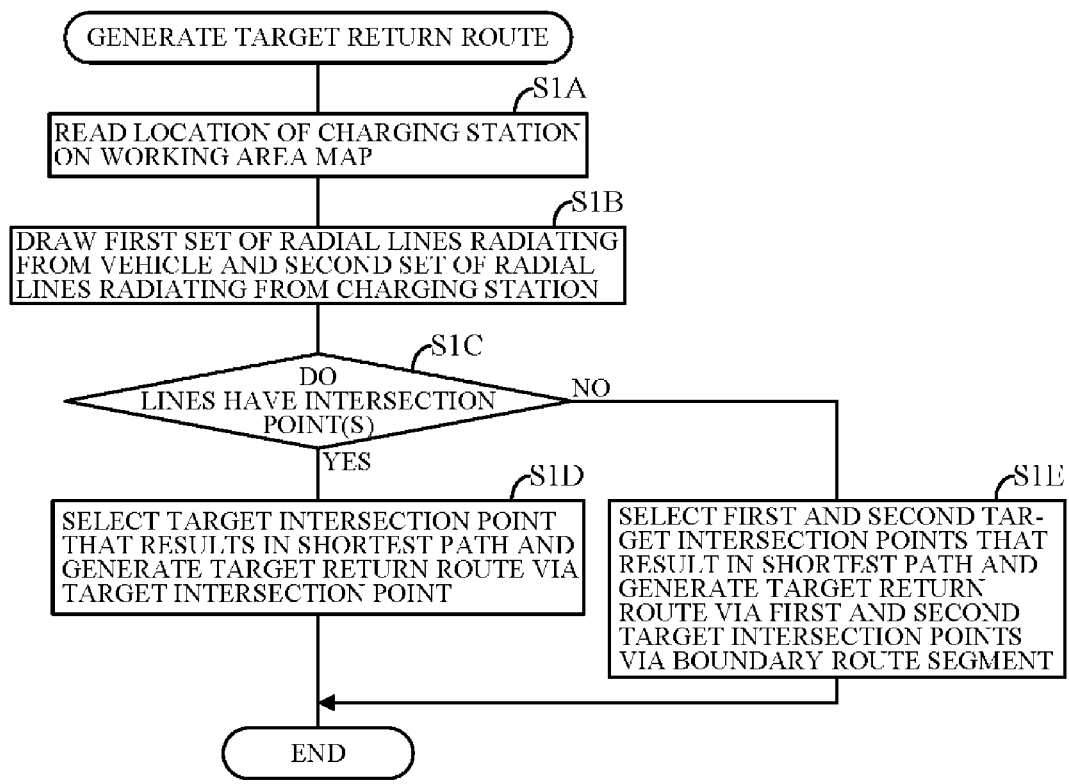
FIG. 11 is a diagram showing a subroutine of processing of FIG. 9.

FIG. 11 is a subroutine flowchart detailing the processing (route generation processing) of S1. As shown in FIG. 11, when generating the target return route RT, first, in S1A, location of the charging station 3 on the working area map MP, namely, origin position of the working area map MP identified by the objective location identifying unit 42 is read.

Next, in S1B, the first set of radial lines 431g radiating from the vehicle 1 and the second set of radial lines 432g radiating from the charging station 3 are drawn on the working area map MP. Then, in S1C, it is determined whether the first set of radial lines 431g and second set of radial lines 432g drawn in S1B have one or more of the intersection points P1.

When the result in S1C is YES, the program goes to S1D, in which, when the lines 431g, 432g have two or more intersection points P1, one of the intersection points P1 that results in shortest path from the vehicle 1 to the charging station 3 is selected as a target intersection point P1a. Then, from among the first set of radial lines 431g and the second set of radial lines 432g, the first radial line 431s and second radial line 432s crossing at the target intersection point P1a is selected and the target return route RT through the first radial line 431s and second radial line 432s via the target intersection point P1a is generated.

On the other hand, when the result in S1C is NO, the program goes to S1E, in which, from among the first intersection points P11 where the first set of radial lines 431g and the boundary line L0 intersect and the second intersection points P21 where the second set of radial lines 432g and the boundary line L0 intersect, a first target intersection point P11a and a second target intersection point P21a that result in shortest path from the vehicle 1 to the charging station 3 are selected. In other words, the boundary route segment RTa that results in shortest path from the vehicle 1 to the charging station 3 is selected.

Then, the first radial line 431s including the first target intersection point P11a is selected from among the first set of radial lines 431g and the second radial line 432s including the second target intersection point P21a is selected from among the second set of radial lines 432g. Then the target return route RT through the first radial line 431s and second radial line 432s via the boundary route segment RTa is finally selected.

Upon completion of target return route RT generation, the program goes to S2 of FIG. 10 flowchart. The ensuing processing is performed primarily by the travel controlling unit 44.

In S2, the output of the orientation sensor 54 is calibrated. For example, operation of the travel motors 18 is controlled to make the vehicle 1 rotate in place by 360 degrees to perform calibration. Details of the calibration are omitted here.

Next, in S3, current position of the vehicle 1 on the working area map MP is detected from the output of the position sensor 55 every predetermined time interval (e.g., 1 sec).

Next, in S4, it is determined whether the vehicle 1 is traveling on the target return route RT by comparing the target return route RT and detected current position of the vehicle 1.

When the result in S4 is NO, the program goes to S5, in which operation of the travel motors 18 is controlled to make the vehicle 1 turn toward the target return route RT by ascertaining current orientation of the vehicle 1 from the outputs of the orientation sensor 54 and/or angular velocity sensor 52.

Then the program goes to S6, this is the same when the result in S4 is YES. In S6, it is determined whether the vehicle 1 is situated inside the working area AR based on the output of the magnetic sensors 51.

When the result in S6 is NO, the program goes to S7, in which operation of the travel motors 18 is controlled to make the vehicle 1 turn toward the working area AR side by ascertaining current orientation of the vehicle 1 from the outputs of the orientation sensor 54 and/or angular velocity sensor 52, whereafter the program returns to S3.

On the other hand, when the result in S6 is YES, the program goes to S8, in which it is determined whether an obstacle(s) is present in the direction of vehicle 1 advance based on the output of the contact sensor 56.

When the result in S8 is YES, the program goes to S9, in which operation of the travel motors 18 is controlled to make the vehicle 1 back up by a predetermined amount (distance).

Next, the program returns to S1 to generate a new target return route RT. Namely, since the target return route RT of the preceding cycle is impassable owing to presence of an obstacle, that route RT is discarded and a new one of the target return route RT of shortest distance from the vehicle 1 to the charging station 3 is generated.

On the contrary, when the result in S8 is NO, the program goes to S10, in which operation of the travel motors 18 is controlled to make the vehicle 1 travel straight forward.

Next, in S11, it is discriminated whether the charging station 3 is detected, i.e., whether the vehicle 1 enters the charger detection zone 3a based on the output of the magnetic sensors 51. When the result in S11 is NO, the program returns to S3 to repeat the processing mentioned above.

On the other hand, when the result in S11 is YES, the program goes to S12, in which a docking operation is performed to connect the terminals 22 of the vehicle 1 to the terminals 33 of the charging station 3. Docking direction depends on how the charging station 3 is deployed and is indicated by arrow C in the example of FIG. 4.

The terminals 22 are installed at the vehicle 1 front end in direction of advance, so the vehicle 1 is driven toward the charging station 3 along the arrow C direction during docking. As a result, the terminals 22 and 33 connect with one another and the battery 20 is charged through the terminals 22 and 33.

Operation of the ECU 40 will be explained more concretely. When the output of the voltage sensor 58 falls to or below a predetermined value during travel in work mode and the battery 20 requires charging, operating mode is switched to return mode. If the vehicle 1 is situated at A or B of FIG. 8 at this time, the route generating unit 43 of the ECU 40 generates the target return route RT via the target intersection point P1a selected from among the intersection points P1 of the first set of radial lines 431g and second set of radial lines 432g that results in shortest distance from the vehicle 1 to the charging station 3 (S1D).

In response to the control of the travel controlling unit 44, the vehicle 1 first drives straight forward along the first radial line 431s of the target return route RT (S10). If the vehicle 1 goes past the target intersection point P1a and deviates from the target return route RT, it turns toward the target return route RT (S5). Subsequently, the vehicle 1 travels straight forward along the second radial line 432s (S10). When an obstacle (e.g., a person) is detected during forward travel, the vehicle 1 backs up a predetermined amount (S9). At this time, the route generating unit 43 generates a new one of the target return route RT that avoids collision with the obstacle. Upon reaching near the charging station 3, the vehicle 1 commences docking operation to connect the terminals 22 of the vehicle 1 and the terminals 33 of the charging station 3 (S12).

On the other hand, when the vehicle 1 is situated at A or B of FIG. 9 at the time of transition to return mode, the route generating unit 43 generates the target return route RT via the first target intersection point P11a and the second target intersection point P21a selected from among first intersection points P11 of the first set of radial lines 431g and the boundary line L0 and second intersection points P21 of the second set of radial lines 432g and the boundary line L0 that result in shortest distance from the vehicle 1 to the charging station 3 (S1E).

In this case, the vehicle 1 travels straight forward along the first radial line 431s in response to the control of the travel controlling unit 44 (S10), and when it goes beyond the boundary wire 2, it turns toward the working area AR side (S7). Subsequently, the vehicle 1 trace-drives along the boundary wire 2 until reaching the second target intersection point P21a. When the vehicle 1 goes past the second target intersection point P21a and deviates from the target return route RT, it turns toward the target return route RT (S5). Subsequently, the vehicle 1 travels straight forward along the second radial line 432 (S10).

As stated above, the present embodiment is configured to have an apparatus and method for controlling operation of an autonomously navigating utility vehicle (1) equipped with a prime mover (18) to travel about a working area (AR)

delineated by a boundary wire (2) in order to perform work autonomously, characterized by: a position detector (55, S3) that detects a position of the vehicle (1) in the working area (AR); an objective location identifying unit (42, S1, S1A) that identifies a location of an objective (e.g., a charging station 3) in the working area (AR); a route generating unit (43, S1, S1A-S1E) that generates a target return route (RT) for the vehicle to return from the position detected by the position detector to the objective whose location is identified by the objective location identifying unit, the route generating unit selecting, among a first set of radial lines (431g) imaginarily drawn on the working area to radiate from the position of the vehicle (1) and a second set of radial lines (432g) imaginarily drawn on the working area (AR) to radiate from the location of the objective (3), a first radial line (431s) and a second radial line (432s) that result in shortest distance from the position of the vehicle (1) to the location of the objective (3) and generating the target return route (RT) by the first radial line (431s) and the second radial line (432s); and a travel controlling unit (44, S4-S12) that controls operation of the prime mover (18) to make the vehicle (1) travel along the target return route (RT) generated by the route generating unit. The first set of radial lines (431g) and the second set of radial lines (432g) are imaginarily drawn on the working area (AR) to radiate at predetermined angular increments.

Namely, in the present embodiment, position of the vehicle 1 is detected by the position sensor 55, the first set of radial lines 431g radiating from current position of the vehicle 1 and the second set of radial lines 432g radiating from the charging station 3 are formed, and a pair of radial lines 431s and 432s that results in shortest distance (distance traveled) from the vehicle 1 to the charging station 3 is selected from among the sets of radial lines 431g and 432g. This makes it possible to return the vehicle 1 to the charging station 3 by passing inside the working area AR. Distance traveled on return to the objective position can therefore be shortened compared to the case of returning the vehicle 1 by trace-driving, thereby enabling efficient return operation of the vehicle 1, i.e., achieving efficient travel to the target position. Moreover, since the vehicle 1 need not be returned along the boundary wire 2 as in trace mode, formation of ruts also can be prevented.

In this connection, when the vehicle 1 equipped with the position sensor 55 is to be returned to the charging station 3, it is conceivable to detect current position of the vehicle 1 with the position sensor 55 and to use as a return route a path that is a straight line connecting this position of the vehicle 1 and the position of the charging station 3 on the working area map MP. In this case, however, when the boundary wire 2 crosses the straight line, part of the straight line comes to be situated outside the working area AR. As a result, a section through which the vehicle 1 is not allowed to travel arises on the return route, making efficient return operation of the vehicle 1 difficult.

As regards this issue, in the present embodiment the target return route RT is generated using the sets of radial lines 431g and 432g radiating from the vehicle 1 and charging station 3, so that the vehicle 1 can be returned in shortened return time via a simple route that avoids the boundary wire 2 even when the boundary wire 2 is present on a straight line connecting the vehicle 1 and the charging station 3 (as in the case of return from position B in FIG. 8, for example). In accordance with the present embodiment, efficient return operation can be achieved even in cases where the working area AR is of complicated shape, such as when a narrow area is present between the vehicle 1 and the charging station 3.

In the apparatus and method, the route generating unit calculates intersection points (P1) of the first set of radial lines (431g) and the second set of radial lines (432g) on the working area (AR), selects a target intersection point (P1a) among the calculated intersection points (P1) such that the first radial line (431s) and the second radial line (432s) result in the shortest distance from the position of the vehicle (1) to the objective (3) when connected with each other via the target intersection point (P1a).

With this, in addition to the advantages and effects mentioned above, the target return route RT comprises a combination of the first radial line and the second radial line, i.e., a pair of forward runs, so that travel pattern is simple and travel control easy.

In the apparatus and method, the route generating unit calculates first intersection points (P11) where the first set of radial lines (431g) and the boundary wire (2) intersect and second intersection points (P21) where the second set of radial lines (432g) and the boundary wire (2) intersect, and among the first intersection points (P11) and the second intersection points (P21), selects a first target intersection point (P11a) and a second target intersection point (P21a) connected to a boundary route segment such that the first radial line (431s) and the second radial line (432s) along the boundary route segment (RTa) result in shortest distance from the position of the vehicle (1) to the objective (3) when connected with each other via the first target intersection point (P11a) and the second target intersection point (P21a).

With this, in addition to the advantages and effects mentioned above, even when no intersection point P1 of the first radial line 431 and the second radial line 432 exists and instead when the target return route RT includes the boundary route segment RTa (FIG. 9), return route travel distance can be shortened because the boundary route segment RTa is of minimum length. So in accordance with the present embodiment, efficient return operation can be achieved even in cases where the working area AR is of complicated shape, such as when a narrow area is present between the vehicle 1 and the charging station 3. The vehicle 1 can be returned by the shortest route In the apparatus and method, the route generating unit (43) generates the target return route (RT) on a map (MP) of the working area (AR) that is formed by arraying multiple cells (2a) and that represents the first set of radial lines (431g) and the second set of radial lines (432g) imaginarily drawn on the working area (AR).

With this, in addition to the advantages and effects mentioned above, owing to use of the working area map MP, it suffices to store the target return route RT as attribute data of cells 2a along with XY position coordinates and to return the vehicle 1 in cell units, thus facilitating data processing.

The apparatus and method further includes: an obstacle detector (56, S8) that detects an obstacle present before the vehicle (1); and the travel controlling unit controls operation of the prime mover (18) to make the vehicle (1) back up when the obstacle is detected by the obstacle detector (S9).

With this, in addition to the advantages and effects mentioned above, obstacles can be avoided and the vehicle 1 efficiently returned to the charging station 3.

In the above the configurations of the map generating unit 41, objective location identifying unit 42, route generating unit 43, and travel controlling unit 44 as well as other devices are examples and should not be interpreted to be limited to those disclosed in the embodiment.

In the above, as the orientation detector for detecting vehicle orientation, it is possible to use the angular velocity sensor 52 instead of the orientation sensor 54 or together with the orientation sensor 54.

Although the present embodiment is configured such that the vehicle 1 is driven by the prime mover comprising a pair of travel motors 18L, 18R, it may be configured such that the vehicle 1 can be driven by other prime mover such as an internal combustion engine.

It should be noted in the above that, although the present embodiment is applied for a lawn mower for lawn or grass mowing work, it may applied to any other type of utility vehicle.

While the present invention has been described with reference to the preferred embodiments thereof, it will be understood, by those skilled in the art, that various changes and modifications may be made thereto without departing from the scope of the appended claims.

What is claimed is:

1. An apparatus for controlling operation of an autonomously navigating utility vehicle equipped with a prime mover to travel about a working area delineated by a boundary wire in order to perform work autonomously, comprising:
    a position detector that detects a position of the vehicle in the working area;
    an objective location identifying unit that identifies a location of an objective in the working area;
    a route generating unit that generates a target return route for the vehicle to return from the position detected by the position detector to the location of the objective;
    wherein to generate the target return route, the route generating unit selects, among a first set of radial lines imaginarily drawn on the working area to radiate from the position of the vehicle and a second set of radial lines imaginarily drawn on the working area to radiate from the location of the objective, a first radial line and a second radial line that result in a shortest distance from the position of the vehicle to the location of the objective, and generates the target return route by the first radial line and the second radial line;
    wherein the route generating unit calculates intersection points of the first set of radial lines and the second set of radial lines on the working area, and selects a target intersection point among the calculated intersection points such that the first radial line and the second radial line result in the shortest distance from the position of the vehicle to the location of the objective when connected with each other via the target intersection point; and
    a travel controlling unit that controls operation of the prime mover to make the vehicle travel along the target return route generated by the route generating unit.

2. The apparatus according to claim 1, wherein the route generating unit calculates first intersection points where the first set of radial lines and the boundary wire intersect and second intersection points where the second set of radial lines and the boundary wire intersect, and among the first intersection points and the second intersection points, selects a first target intersection point and a second target intersection point connected to a boundary route segment such that the first radial line and the second radial line along the boundary route segment result in the shortest distance from the position of the vehicle to the location of the objective when connected with each other via the first target intersection point and the second target intersection point.

3. The apparatus according to claim 1, wherein the route generating unit generates the target return route on a map of the working area that is formed by arraying multiple cells and that represents the first set of radial lines and the second set of radial lines imaginarily drawn on the working area.

4. The apparatus according to claim 1, further including:
    an obstacle detector that detects an obstacle present before the vehicle; and
    the travel controlling unit controls operation of the prime mover to make the vehicle back up when the obstacle is detected by the obstacle detector.

5. The apparatus according to claim 1, wherein the first set of radial lines and the second set of radial lines are imaginarily drawn on the working area to radiate at predetermined angular increments.

6. A method for controlling operation of an autonomously navigating utility vehicle equipped with a prime mover to travel about a working area delineated by a boundary wire in order to perform work autonomously, the method comprising:
    detecting, with a control apparatus on the vehicle, a position of the vehicle in the working area;
    identifying, with the control apparatus, a location of an objective in the working area;
    generating, with the control apparatus, a target return route for the vehicle to return from the position of the vehicle to the location of the objective;
    wherein generating the target return route for the vehicle comprises selecting, among a first set of radial lines imaginarily drawn on the working area to radiate from the position of the vehicle and a second set of radial lines imaginarily drawn on the working area to radiate from the location of the objective, a first radial line and a second radial line that result in a shortest distance from the position of the vehicle to the location of the objective, and generating the target return route by the first radial line and the second radial line;
    wherein generating the target return route for the vehicle comprises calculating intersection points of the first set of radial lines and the second set of radial lines on the working area, and selecting a target intersection point among the calculated intersection points such that the first radial line and the second radial line result in the shortest distance from the position of the vehicle to the location of the objective when connected with each other via the target intersection point; and
    controlling, with the control apparatus, operation of the prime mover to make the vehicle travel along the target return route.

7. The method according to claim 6, wherein generating the target return route for the vehicle comprises:
    calculating first intersection points where the first set of radial lines and the boundary wire intersect and second intersection points where the second set of radial lines and the boundary wire intersect, and among the first intersection points and the second intersection points, selecting a first target intersection point and a second target intersection point connected to a boundary route segment such that the first radial line and the second radial line along the boundary route segment result in the shortest distance from the position of the vehicle to the location of the objective when connected with each other via the first target intersection point and the second target intersection point.

8. The method according to claim 6, wherein generating the target return route for the vehicle comprises:
    generating the target return route on a map of the working area that is formed by arraying multiple cells and that represents the first set of radial lines and the second set of radial lines imaginarily drawn on the working area.

9. The method according to claim 6, further comprising:
detecting, with the control apparatus, an obstacle present before the vehicle;
wherein controlling operation of the prime mover comprises controlling operation of the prime mover to make the vehicle back up when the obstacle is detected.

10. The method according to claim 6, wherein the first set of radial lines and the second set of radial lines are imaginarily drawn on the working area to radiate at predetermined angular increments.

* * * * *